(12) United States Patent
Park et al.

(10) Patent No.: US 11,811,076 B2
(45) Date of Patent: Nov. 7, 2023

(54) SECONDARY BATTERY AND METHOD FOR MANUFACTURING THE SAME, AND PRESSING BLOCK FOR MANUFACTURING SECONDARY BATTERY

(71) Applicant: LG Chem, Ltd., Seoul (KR)

(72) Inventors: Sung Chul Park, Daejeon (KR); Sang Wook Kim, Daejeon (KR); Dae Won Lee, Daejeon (KR); Dong Hyeuk Park, Daejeon (KR)

(73) Assignee: LG Energy Solution, Ltd.

( * ) Notice: Subject to any disclaimer, the term of this patent is extended or adjusted under 35 U.S.C. 154(b) by 365 days.

(21) Appl. No.: 16/466,212

(22) PCT Filed: Aug. 29, 2018

(86) PCT No.: PCT/KR2018/009988
§ 371 (c)(1),
(2) Date: Jun. 3, 2019

(87) PCT Pub. No.: WO2019/045447
PCT Pub. Date: Mar. 7, 2019

(65) Prior Publication Data
US 2020/0067029 A1 Feb. 27, 2020

(30) Foreign Application Priority Data

Aug. 29, 2017 (KR) .................. 10-2017-0109442
Aug. 27, 2018 (KR) .................. 10-2018-0100284

(51) Int. Cl.
*H01M 50/105* (2021.01)
*B29C 53/06* (2006.01)

(52) U.S. Cl.
CPC ........... *H01M 50/105* (2021.01); *B29C 53/06* (2013.01)

(58) Field of Classification Search
CPC ... H01M 50/10; H01M 50/102; H01M 50/105
See application file for complete search history.

(56) References Cited

U.S. PATENT DOCUMENTS 6,319,630 B1 * 11/2001 Hasegawa ............ H01M 50/116
429/162
2007/0009795 A1 1/2007 Otohata et al.
(Continued)

FOREIGN PATENT DOCUMENTS

CN 1864284 A 11/2006
CN 102959760 A 3/2013
(Continued)

OTHER PUBLICATIONS

JP2016009677A Espacenet machine translation (Year: 2016).*
(Continued)

*Primary Examiner* — Amanda C. Walke
(74) *Attorney, Agent, or Firm* — Lerner David LLP

(57) ABSTRACT

The present invention relates to a secondary battery, a method for manufacturing the same, and a pressing block for manufacturing the secondary battery. The method for manufacturing the secondary battery according to the present invention comprises a forming step of forming a pouch sheet to form an accommodation part in which an electrode assembly is accommodated, a folding step of folding the pouch sheet with respect to a folding part to accommodate the electrode assembly in the accommodation part, and to block the accommodation part from outside to form a battery case, and an anti-wrinkle step of forming an anti-wrinkle bending part on an outer shell of the pouch sheet to prevent wrinkles from being generated on the outer shell of the folded pouch sheet.

19 Claims, 20 Drawing Sheets

(56) References Cited

U.S. PATENT DOCUMENTS

| | | | |
|---|---|---|---|
| 2009/0258290 A1* | 10/2009 | Lee | H01M 50/183 |
| | | | 429/163 |
| 2009/0311592 A1 | 12/2009 | You et al. | |
| 2011/0091766 A1 | 4/2011 | Kim | |
| 2013/0101884 A1 | 4/2013 | Ueda | |
| 2013/0244095 A1* | 9/2013 | Min | H01M 10/052 |
| | | | 429/185 |
| 2013/0252081 A1 | 9/2013 | Kim et al. | |
| 2014/0147730 A1 | 5/2014 | Werner | |
| 2014/0003085 A1 | 10/2014 | Kim et al. | |
| 2014/0304980 A1 | 10/2014 | Kim et al. | |
| 2015/0079435 A1 | 3/2015 | Shim et al. | |
| 2015/0138740 A1* | 5/2015 | Shin | H05K 3/285 |
| | | | 522/182 |
| 2015/0325820 A1* | 11/2015 | Sohn | H01M 50/103 |
| | | | 429/127 |
| 2016/0079576 A1 | 3/2016 | Lim et al. | |
| 2016/0218327 A1* | 7/2016 | Takahashi | H01M 50/105 |
| 2016/0351864 A1 | 12/2016 | Yoon et al. | |
| 2017/0133707 A1 | 5/2017 | Han et al. | |
| 2017/0170437 A1 | 6/2017 | Lee et al. | |
| 2018/0219245 A1* | 8/2018 | Choi | H01M 10/045 |

FOREIGN PATENT DOCUMENTS

| | | | | |
|---|---|---|---|---|
| CN | 105981194 | A | 9/2016 | |
| CN | 105981196 | A | 9/2016 | |
| CN | 106471637 | A | 3/2017 | |
| CN | 106935742 | A | 7/2017 | |
| EP | 3091590 | A1 | 11/2016 | |
| EP | 3147963 | A1 | 3/2017 | |
| JP | 2000173559 | A | 6/2000 | |
| JP | 2015-531157 | A | 10/2015 | |
| JP | 2016-009677 | A | 1/2016 | |
| KR | 10-2006-0087185 | A | 8/2006 | |
| KR | 10-2007-0102768 | A | 10/2007 | |
| KR | 20120008297 | A | 1/2012 | |
| KR | 101192619 | B1 | 10/2012 | |
| KR | 10-2014-0013266 | A | 2/2014 | |
| KR | 10-2014-0015647 | A | 2/2014 | |
| KR | 10-2015-0096325 | A | 8/2015 | |
| KR | 10-2016-0032906 | A | 3/2016 | |
| KR | 20160054242 | A | 5/2016 | |
| KR | 20170052061 | A * | 5/2017 | H01M 50/116 |
| WO | 2017078437 | A1 | 5/2017 | |

OTHER PUBLICATIONS

Extended European Search Report with Written Opinion for Application No. 18851067.1 dated Apr. 9, 2020, 7 pages.

International Search Report for Application No. PCT/KR2018/009988 dated Dec. 4, 2018, 2 pages.

Chinese Search Report for Application No. 201880007844.5, dated Jul. 12, 2021, 3 pages.

* cited by examiner

SECONDARY BATTERY AND METHOD FOR MANUFACTURING THE SAME, AND PRESSING BLOCK FOR MANUFACTURING SECONDARY BATTERY

CROSS-REFERENCES TO RELATED APPLICATIONS

This application is a U.S. national phase application, pursuant to 35 U.S.C. § 371, of PCT/KR2018/009988, filed Aug. 29, 2018, designating the United States, which claims priority to Korean Application No. 10-2017-0109442, filed Aug. 29, 2017, and Korean Application No. 10-2018-0100284, filed Aug. 27, 2018. The entire contents of the aforementioned patent applications are incorporated herein by this reference.

TECHNICAL FIELD

The present invention relates to a secondary battery and a method for manufacturing the same, and a pressing block for manufacturing the secondary battery.

BACKGROUND ART

Rechargeable batteries are rechargeable unlike primarily batteries. Due to the feasibility of compact size and high capacity, many studies on rechargeable batteries are being carried out recently. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries depending on a shape of a battery case. In such a secondary battery, an electrode assembly disposed within a battery case is a chargeable and dischargeable power generating device having a structure in which an electrode and a separator are stacked.

The electrode assembly may be generally classified into a jelly-roll type electrode assembly in which a separator is interposed between a positive electrode and a negative electrode, each of which is provided as a form of a sheet coated with an active material, and subsequently, the positive electrode, the separator, and the negative electrode are wound; a stacked type electrode assembly in which a plurality of positive and negative electrodes with a separator therebetween are sequentially stacked; and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is receiving much attention due to its low manufacturing cost, reduced weight, flexibility in shaping, and the like, and thus, its usage is gradually increasing.

FIG. 1 is a perspective view of a secondary battery according to a related art.

Referring to FIG. 1, there has been a problem in that a wrinkle 12 is generated on an outer shell 11 of a battery case 10 and in the vicinity of the outer shell 11 while a secondary battery according to the related art is manufactured.

In more detail, there has been a problem in that a wrinkle 12 having a bat-ear shape is generated on the outer shell 11 of the battery case 10 and in the vicinity of the outer shell 11 while vacuum is applied to discharge an internal gas of the battery case 10 to the outside.

In addition, there has been a problem in that interference occurs between the stacked secondary battery 1 when a plurality of secondary batteries 1 are stacked to be modularized because the wrinkle 12 is generated on the battery case 10.

DISCLOSURE OF THE INVENTION

Technical Problem

One aspect of the present invention is to provide a secondary battery, which is capable of preventing a wrinkle from being generated on an outer shell of a battery case in the secondary battery, and a method for manufacturing the same, and a pressing block for manufacturing the secondary battery.

Technical Solution

In a secondary battery and a method for manufacturing the secondary battery according to an embodiment of the present invention, the method for manufacturing the secondary battery comprises: a forming step of forming a pouch sheet to form an accommodation part in which an electrode assembly is accommodated; a folding step of folding the pouch sheet with respect to a folding part to accommodate the electrode assembly in the accommodation part, and to block the accommodation part from outside to form a battery case; and an anti-wrinkle step of forming an anti-wrinkle bending part on an outer shell of the pouch sheet to prevent wrinkles from being generated on the outer shell of the folded pouch sheet.

In addition, a secondary battery according to an embodiment of the present invention comprises: an electrode assembly in which electrodes and separators are alternately combined and stacked on each other and a battery case formed by folding a pouch sheet to accommodate the electrode assembly, wherein an anti-wrinkle bending part is formed on an outer shell of the battery case to prevent wrinkles from being generated on the outer shell of the battery case.

Furthermore, a pressing block for a secondary battery according to an embodiment of the present invention comprises a plurality of pressing blocks configured to move in a direction that faces each other to press and compress an outer shell of a pouch sheet in which an electrode assembly is accommodated and a bending formation part formed on each of pressing surfaces of the plurality of pressing blocks to form an anti-wrinkle bending part on the outer shell when the outer shell of the pouch sheet is pressed by the plurality of pressing blocks.

Advantageous Effects

According to the present invention, the anti-wrinkle bending part may be formed on the outer shell of the battery case in the secondary battery to prevent the wrinkle from being generated on the outer shell. Particularly, when vacuum is applied to discharge the internal gas of the battery case to the outside, the wrinkle having the bat-ear shape may be prevented from being generated on the outer shell of the battery case and in the vicinity of the outer shell. The anti-wrinkle bending part may be disposed on the opposite side of the gas pocket part, through which the internal gas is discharged, in the outer shell of the battery case to support the opposite side of the gas pocket part when the vacuum is applied, thereby effectively preventing the wrinkle from being generated on the opposite side of the gas pocket part and the vicinity of the opposite side.

MODE FOR CARRYING OUT THE INVENTION

Figure 1:
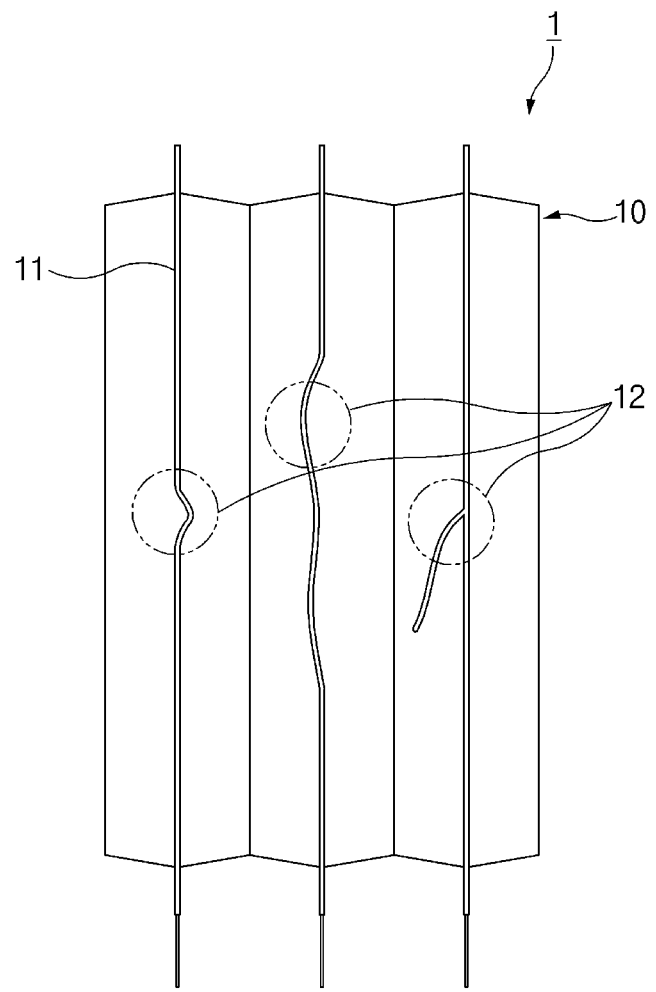
FIG. 1 is a perspective view of a secondary battery according to a related art.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in different drawings. In addition, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
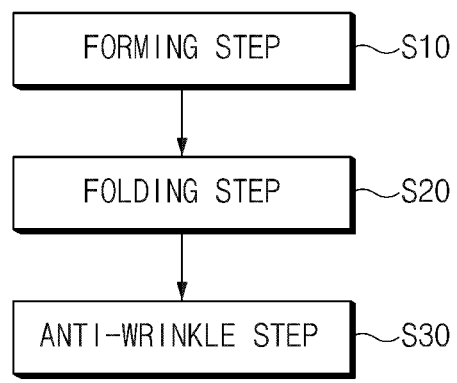
FIG. 2 is a flowchart illustrating a method for manufacturing a secondary battery according to an embodiment of the present invention.
Figure 3:
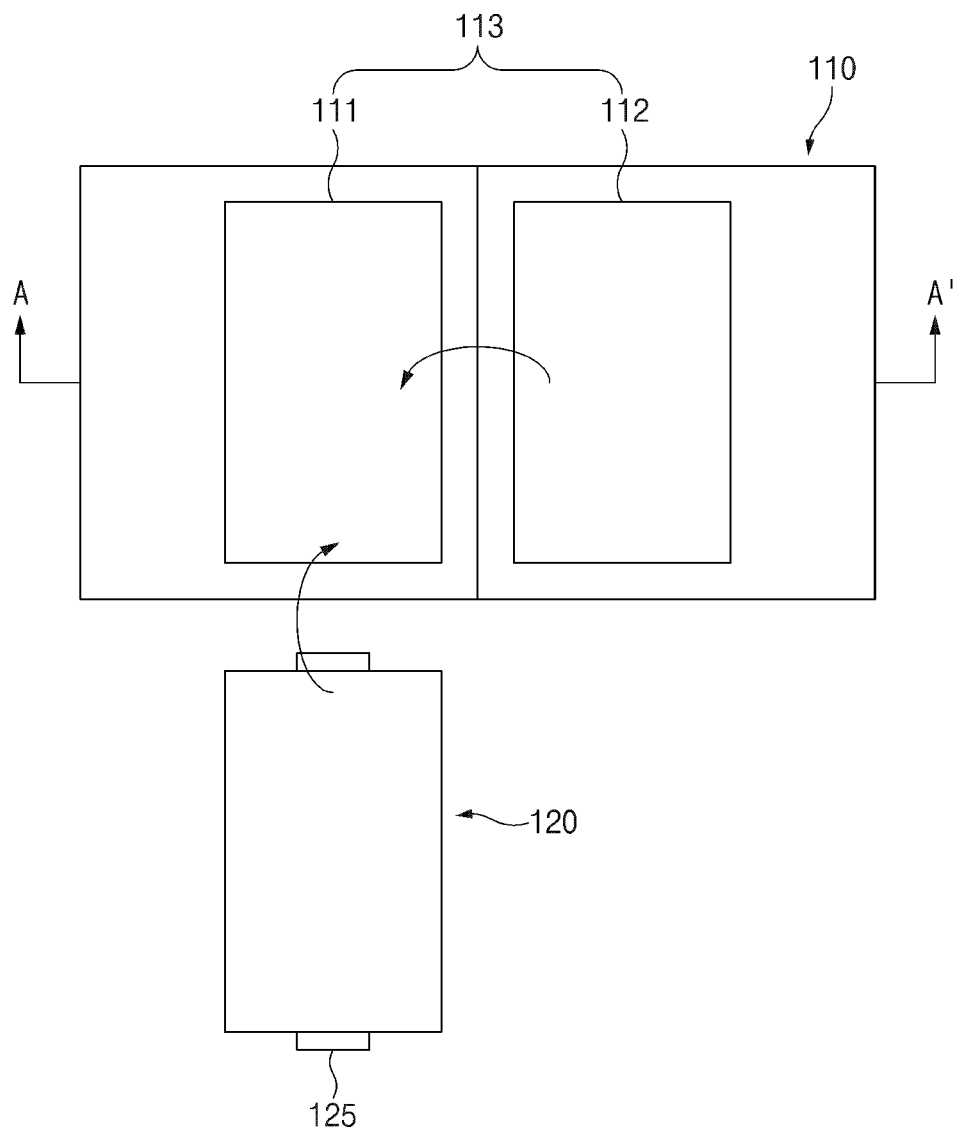
FIG. 3 is a plan view illustrating a forming step in the method for manufacturing the secondary battery according to a first embodiment of the present invention.

FIG. 2 is a flowchart illustrating a method for manufacturing a secondary battery according to an embodiment of the present invention, and FIG. 3 is a plan view illustrating a forming step in the method for manufacturing the secondary battery according to a first embodiment of the present invention.

Referring to FIGS. 2 and 3, a method for manufacturing a secondary battery 100 according to a first embodiment of the present invention comprises a forming step (S10) of forming a pouch sheet 110, a folding step (S20) of folding the pouch sheet 110, and an anti-wrinkle step (S30) of forming an anti-wrinkle bending part 115 on an outer shell 114 of the pouch sheet 110. Additionally, the method for manufacturing the secondary battery according to the first embodiment of the present invention may further comprise a sealing step of sealing the outer shell 114 of the pouch sheet 110 after the folding step (S20) (see FIG. 6).

Figure 4:
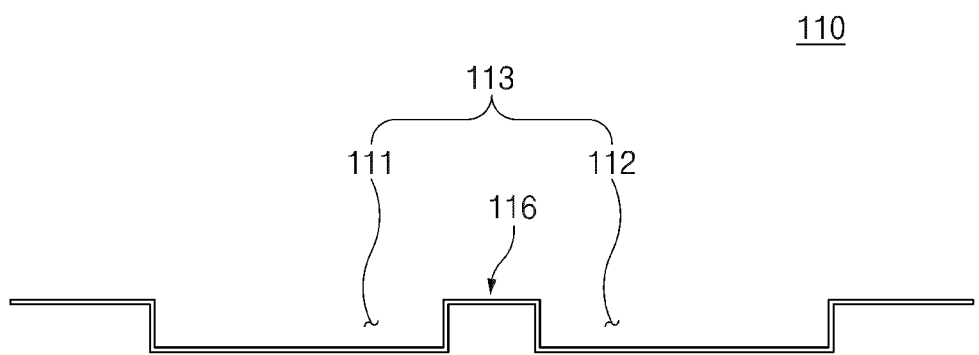
FIG. 4 is a cross-sectional view taken along line A-A' of FIG. 3.

FIG. 4 is a cross-sectional view taken along line A-A' of FIG. 3.

Hereinafter, the method for manufacturing the secondary battery according to the first embodiment of the present invention will be described in more detail with reference to FIGS. 2 to 8.

Referring to FIGS. 2 to 4, in the forming step (S10), the pouch sheet 110 is formed to form an accommodation part 113 in which an electrode assembly 120 is accommodated. In particular, the accommodation part 113 may comprise a first accommodation part 111 and a second accommodation part 112.

Additionally, in the forming step (S10), the first accommodation part 111 and the second accommodation part 112 may be formed symmetrically on both sides with respect to the folding part 116 of the pouch sheet 110.

Furthermore, in the forming step (S10), one surface of the pouch sheet 110 may be pressed to form a groove having an opened top surface, thereby forming the accommodation part 113.

The electrode assembly 120 may be a chargeable and dischargeable power generation element and have a structure in which electrodes (not shown) and separators (not shown) are combined and alternately stacked.

The electrodes may comprise a positive electrode and a negative electrode. Each of the separators separates the positive electrode from the negative electrode to electrically insulate the positive electrode from the negative electrode.

The positive electrode may comprise a positive electrode current collector (not shown) and a positive electrode active material (not shown) applied to the positive electrode current collector, and the negative electrode may comprise a negative electrode current collector (not shown) and a negative electrode active material (not shown) applied to the negative electrode current collector.

For example, the positive electrode current collector may be provided as a foil made of an aluminum (Al) material.

The positive electrode active material may comprise, for example, lithium manganese oxide, lithium cobalt oxide, lithium nickel oxide, lithium iron phosphate, or a compound containing at least one of these and mixtures thereof.

For example, the negative electrode current collector may be provided as a foil made of a copper (Cu) or nickel (Ni) material.

The negative electrode active material may comprise synthetic graphite, lithium a metal, a lithium alloy, carbon, petroleum coke, activated carbon, graphite, a silicon compound, a tin compound, a titanium compound, or an alloy thereof.

The separator is made of insulation materials and is alternately stacked with the positive electrode and the negative electrode. In particular, the separator may be disposed between the positive electrode and the negative electrode and outer surfaces of the positive electrode and the negative electrode. Further, the separator may be provided as, for example, a polyolefin-based resin film such as polyethylene or polypropylene having micropores.

One side of an electrode tab 125 is provided on the electrode and then electrically connected to the electrode. The electrode tab 125 may comprise a positive electrode tab and a negative electrode tab. The positive electrode tab may be electrically connected to the positive electrode, and the negative electrode tab may be electrically connected to the negative electrode.

Figure 5:
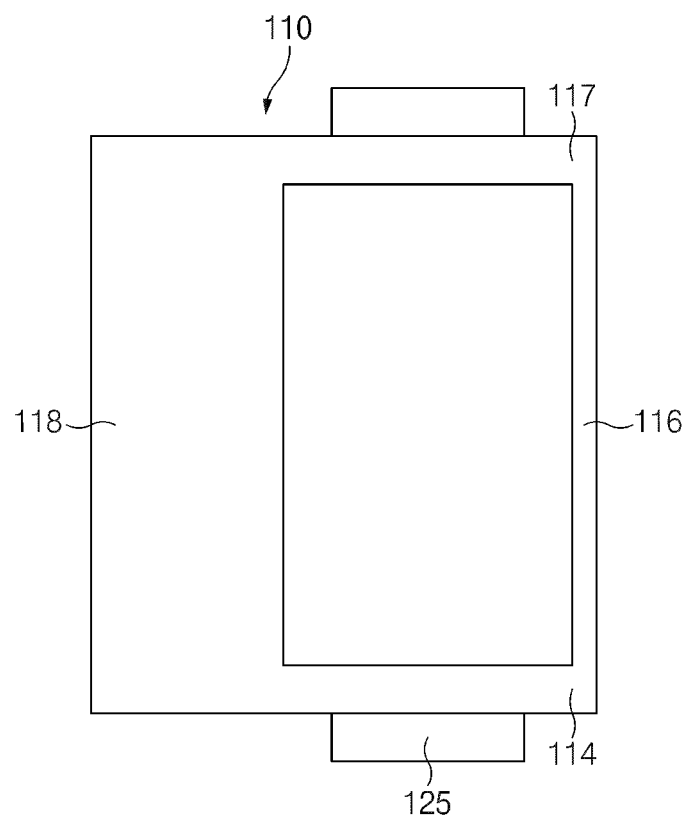
FIG. 5 is a plan view illustrating a folding step in the method for manufacturing the secondary battery according to the first embodiment of the present invention.

FIG. 5 is a plan view illustrating the folding step (S20) in the method for manufacturing the secondary battery according to the first embodiment of the present invention.

Referring to FIGS. 2, 4, and 5, in the folding step (S20), the electrode assembly 120 may be accommodated in the accommodation part 113 of the pouch sheet 110, and subsequently, the pouch sheet 110 may be folded to form the battery case 110.

In particular, in the folding step (S20), the pouch sheet 110 may be folded with respect to a folding part 116 of the pouch sheet 110 to allow the accommodation part 113 of the pouch sheet 110 to be blocked from the outside.

In the folding step (S20), a bending part for folding may be formed along a virtual line of the folding part 116, and the pouch sheet 110 may be folded along the bending part for the folding.

Furthermore, in the folding step (S20), the first accommodation part 111 and the accommodation part 112 in the pouch sheet 110 may be folded to face each other. The battery case 110 may be formed to comprise the accommodation part 113 and a gas pocket part 118 having a passage that extends from the accommodation part 113 through the forming step (S10) and the folding step (S20).

Figure 6:
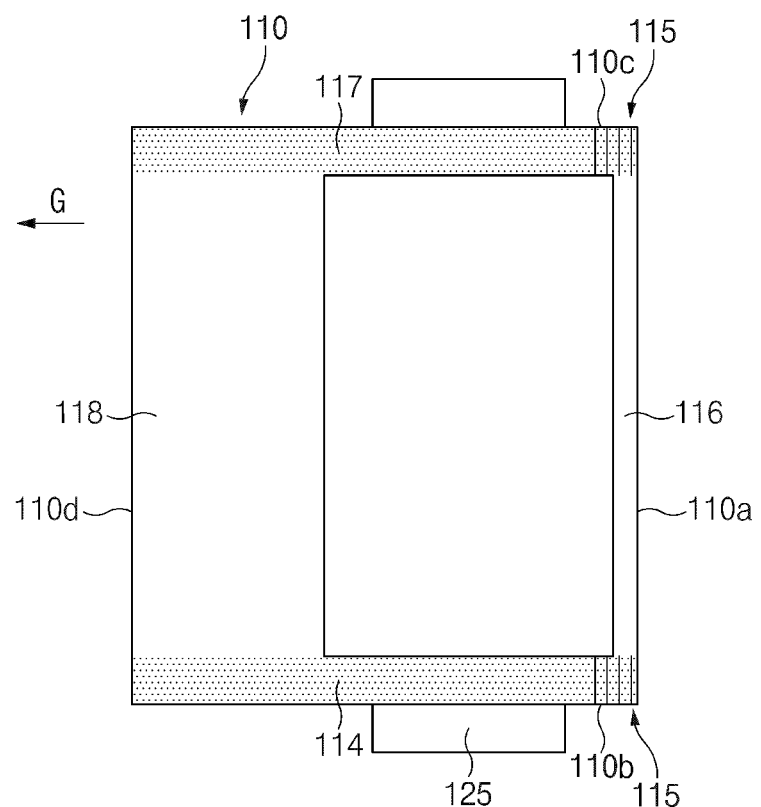
FIG. 6 is a plan view illustrating a sealing step and an anti-wrinkle step in the method for manufacturing the secondary battery according to the first embodiment of the present invention.

FIG. 6 is a plan view illustrating a sealing step and an anti-wrinkle step in the method for manufacturing the secondary battery according to an embodiment of the present invention.

Referring to FIGS. 2 and 6, in the sealing step, the outer shell of the pouch sheet 110 may be sealed after the folding step (S20) to allow a portion of the accommodation part 113 except for a direction of the gas pocket part 118 to be sealed to form the battery case 110.

In the sealing step, the outer shell of the pouch sheet 110 may be thermally fused to form a first sealing part 114 and a second sealing part 117. In particular, the folding part 116 may be formed at a first side 110*a*, the gas pocket part 118 may be formed at a fourth side 110*d* that is opposite to the folding part 116, the first sealing part 114 may be formed at a second side 110*b*, and the second sealing part 117 may be formed at a third side 110*c* in four directions on the outer shell of the battery case 110.

The sealing step may be performed before an anti-wrinkle step (S30) after the folding step (S20).

Furthermore, for another example, the sealing step may be performed together with the anti-wrinkle step (S30) after the folding step (S20).

Figure 7:
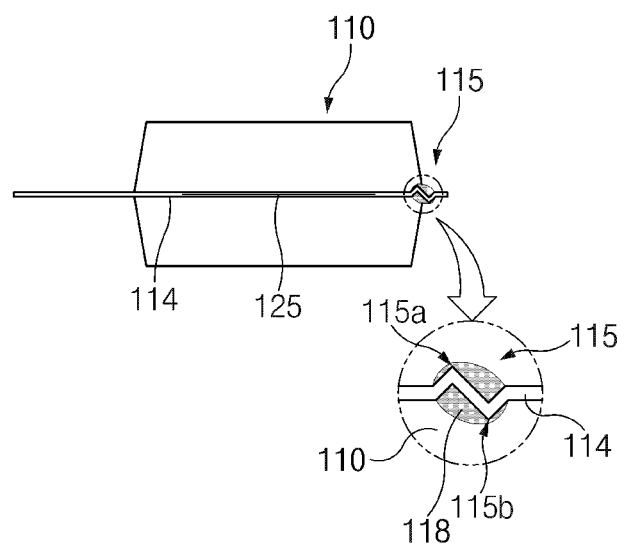
FIG. 7 is a side view illustrating the anti-wrinkle step in the method for manufacturing the secondary battery according to the first embodiment of the present invention.

FIG. 6 is a plan view illustrating the sealing step and the anti-wrinkle step in the method for manufacturing the secondary battery according to the first embodiment of the present invention, and FIG. 7 is a side view illustrating the anti-wrinkle step in the method for manufacturing the secondary battery according to the first embodiment of the present invention.

Referring to FIGS. 2, 6, and 7, in the anti-wrinkle step (S30), the outer shell of the pouch sheet 110 may be thermally pressed to form an anti-wrinkle bending part 115.

Accordingly, the outer shell may be thermally pressed to form the anti-wrinkle bending part 115.

In the anti-wrinkle step (S30), the anti-wrinkle bending part 115 may be bent to have a plurality of bent portions. In particular, in the anti-wrinkle step (S30), the anti-wrinkle bending part 115 may be bent in a zigzag shape.

Further, in the anti-wrinkle step (S30), for example, the anti-wrinkle bending part 115 may be bent in a bent shape. In the anti-wrinkle step (S30), the anti-wrinkle bending part 115 may be bent to have a first bent part 115*a* and a second bent part 115*b*. In particular, in the anti-wrinkle step (S30), the anti-wrinkle bending part 115 may be formed to have an "N"-shaped cross-section.

Furthermore, in the anti-wrinkle step (S30), the anti-wrinkle bending part 115 may be formed to allow the bent portion to be formed vertically with respect to the outer shell that is horizontally formed on one side surface of the battery case 110.

In the anti-wrinkle step (S30), for example, the anti-wrinkle bending part 115 may be formed at a folding part-side of each of the first sealing part 114 and the second sealing part 117 on the outer shell of the battery case 110. In other words, the anti-wrinkle bending part 115 may be formed at a portion of each of the first sealing part 114 and the second sealing part 117, which is in the vicinity of the folding part 116. In the anti-wrinkle step (S30), for example, the anti-wrinkle bending part 115 may be formed to have a length of 5% to 15% of a length of each of the first sealing part 114 and the second sealing part 117. The anti-wrinkle bending part 115 may be formed to have a length equal to or greater than 5% of the length of each of the first sealing part 114 and the second sealing part 117 to effectively achieve the anti-wrinkle effect at the first sealing part 114 and the second sealing part 117. The anti-wrinkle bending part 115 may be formed to have a length equal to or less than 15% of each of the length of each of the first sealing part 114 and the second sealing part 117 to improve workability. In the anti-wrinkle step (S30), for example, the anti-wrinkle bending part 115 may be formed to have a length that corresponds to 10% of the length of each of the first sealing part 114 and the second sealing part 117. In the anti-wrinkle step (S30), when the anti-wrinkle bending part 115 is bent, a bending line may be formed from the first sealing part 114 and the second sealing part 117 toward the gas pocket part 118. In other words, in the anti-wrinkle step (S30), a bending line may be formed in parallel to a gas discharge direction G on the gas pocket part 118.

In the anti-wrinkle step (S30), for another example, the anti-wrinkle bending part 115 may be formed over the entire first and second sealing parts 114 and 117 on the outer shell of the battery case 110.

Furthermore, in the anti-wrinkle step (S30), for another example, the anti-wrinkle bending part 115 may be formed at the folding part 116 on the outer shell of the battery case 110.

In the anti-wrinkle step (S30), for another example, the anti-wrinkle bending part 115 may be formed at the first sealing part 114, the second sealing part 117, and the folding part 116 on the outer shell of the battery case 110.

In the anti-wrinkle step (S30), a shape retaining part 118 may be further formed on an outer surface of the anti-wrinkle bending part 115 to retain a shape of the anti-wrinkle bending part 115. In particular, the shape retaining part 118 may prevent the anti-wrinkle bending part 115 from being deformed and also prevent the anti-wrinkle effect of the pouch sheet 110 from being deteriorated due to the deformation of the anti-wrinkle bending part 115. In the anti-wrinkle step (S30), the shape retaining part 118 may be applied to the outer surface of the anti-wrinkle bending part 115.

Further, the shape retaining part 118 may be made of an insulating material and a heat-resistance material. For example, the shape retaining part 118 may be made of silicone. Thus, the shape retaining part 118 may retain the shape of the anti-wrinkle bending part 115 without being damaged by a high temperature heat.

Figure 8:
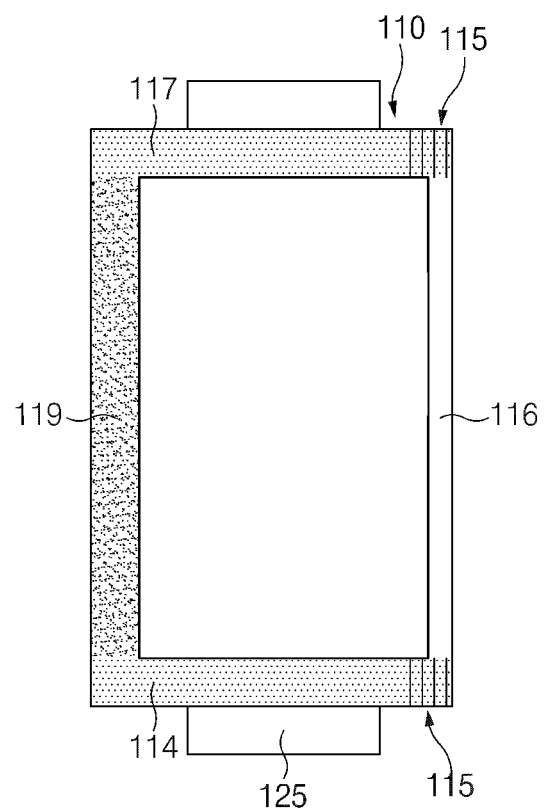
FIG. 8 is a plan view illustrating the sealing step in the method for manufacturing the secondary battery according to the first embodiment of the present invention.

FIG. 8 is a plan view illustrating the sealing step in the method for manufacturing the secondary battery according to the first embodiment of the present invention.

Referring to FIGS. 2, 4, and 8, in the sealing step, the cut portion of the gas pocket part may be sealed to seal the accommodation part 113 after the anti-wrinkle step (S30).

In the sealing step, the cut portion of the gas pocket part 118 may be thermally fused to form a third sealing part 119, thereby safely sealing the battery case 110.

Thus, referring to FIGS. 2, 6, and 7, in the method for manufacturing the secondary battery according to the first embodiment of the present invention, the anti-wrinkle bending part 115 may be formed on the outer shell of the battery case 110 of the secondary battery through the anti-wrinkle step (S30) to prevent the wrinkles from being generated over the outer shell and the vicinity of the outer shell. Particularly, when vacuum is applied to discharge the internal gas of the battery case 110 to the outside, the wrinkle having a bat-ear shape may be prevented from being generated on the outer shell of the battery case 110 and in the vicinity of the outer shell. The anti-wrinkle bending part 115 may be disposed at the opposite side of the gas pocket part 118, through which the internal gas is discharged, on the outer shell of the battery case 110. Thus, when the vacuum is applied, the anti-wrinkle bending part 115 may support the opposite side of the gas pocket part 118 and effectively prevent the wrinkles from being generated on the folding part 116 that is the opposite side of the gas pocket part 118 and the surrounding portion of the folding part-side on the first and second sealing parts 114 and 117, which are in the vicinity of the folding part 116. In addition, after the secondary battery 100 is manufactured, even when a gas generated during the use (charging and discharging) is discharged, the wrinkles of the battery case 10 and the occurrence of the wrinkle may be significantly reduced.

In particular, the process of discharging the internal gas of the battery case 110 may be, for example, performed for discharging the internal gas generated while the charging/discharging of the secondary battery to activate the secondary battery in the process of manufacturing the secondary battery or performed for discharging the internal gas generated while the charging/discharging of the secondary battery during the use of the secondary battery.

Additionally, the anti-wrinkle bending part 115 may be formed on the outer shell of the battery case 110, and the shape retaining part 118 may be applied to the outer surface of the anti-wrinkle bending part 115 to more effectively prevent the anti-wrinkle bending part 115 from being deformed. Thus, the occurrence of the wrinkles on the outer shell and the portion of the battery case 110, which is in the vicinity of the outer shell, may be prevented, and the deformation of the outer appearance of the battery case 110 and the occurrence of cracks in the battery case 110 due to the occurrence of the wrinkles may be prevented.

Figure 9:
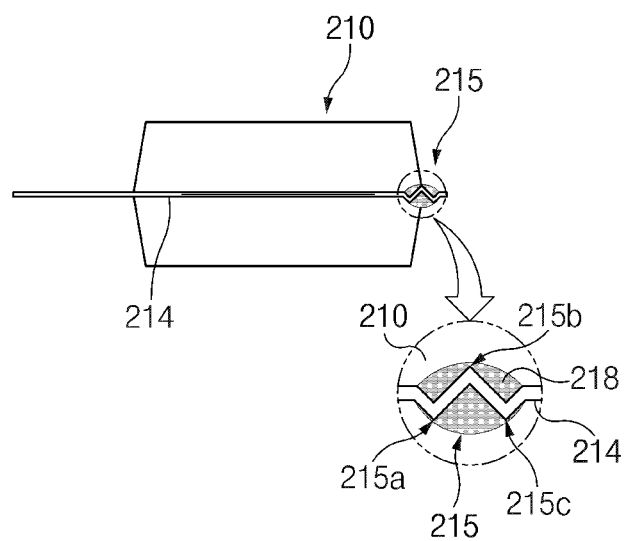
FIG. 9 is a side view illustrating an anti-wrinkle step in a method for manufacturing a secondary battery according to a second embodiment of the present invention.

FIG. 9 is a side view illustrating an anti-wrinkle step in a method for manufacturing a secondary battery according to a second embodiment of the present invention.

Referring to FIGS. 2 and 9, a method for manufacturing a secondary battery 200 according to a second embodiment of the present invention comprises a forming step (S10) of forming a pouch sheet 210, a folding step (S20) of folding the pouch sheet 210, and an anti-wrinkle step (S30) of forming an anti-wrinkle bending part 215 on an outer shell of the pouch sheet 210. Further, the method for manufacturing the secondary battery according to the second embodiment of the present invention may further comprise a sealing step of sealing an outer circumferential surface of the pouch sheet 210 after the folding step (S20).

The method for manufacturing the secondary battery according to the second embodiment of the present invention is the same as the method for manufacturing the secondary battery according to the first embodiment of the present invention except for an anti-wrinkle bending part 215 formed through an anti-wrinkle step (S30).

Thus, contents of this embodiment, which are duplicated with those according to the first embodiment, will be briefly described, and also, differences therebetween will be mainly described. In detail, in the method for manufacturing the secondary battery according to the second embodiment of the present invention, in the anti-wrinkle step (S30), a first sealing part 214 and a second sealing part of a pouch sheet 210 may be thermally compressed to form an anti-wrinkle bending part 215.

In the anti-wrinkle step (S30), the anti-wrinkle bending part 215 may be bent to have a plurality of bent portions. In particular, in the anti-wrinkle step (S30), the anti-wrinkle bending part 215 may be bent in a zigzag shape.

Further, in the anti-wrinkle step (S30), for example, the anti-wrinkle bending part 215 may be bent in a bent shape. In the anti-wrinkle step (S30), the anti-wrinkle bending part 115 may be bent to have a first bent part 215a, a second bent part 215b, and a third bent part 215c. Accordingly, for example, the anti-wrinkle bending part 215 may be formed to have an "W"-shaped cross-section.

In the anti-wrinkle step (S30), the anti-wrinkle bending part 215 may be formed to vertically form the bent portion with respect to the first sealing part 214 and the second sealing part, which are horizontally formed on one side of the battery case 210. Particularly, in the anti-wrinkle step (S30), the anti-wrinkle bending part 215 may be formed at a folding part-side of each of the first sealing part 214 and the second sealing part, which are adjacent to the folding part.

In the anti-wrinkle step (S30), a shape retaining part 218 may be further formed on an outer surface of the anti-wrinkle bending part 215 to retain a shape of the anti-wrinkle bending part 215. The shape retaining part 218 may prevent the anti-wrinkle bending part 215 from being deformed and also prevent the anti-wrinkle effect of the pouch sheet 210 from being deteriorated due to the deformation of the anti-wrinkle bending part 215. In the anti-wrinkle step (S30), the shape retaining part 218 may be applied to the outer surface of the anti-wrinkle bending part 215.

The shape retaining part 218 may be made of an insulating material and a heat-resistance material. For example, the shape retaining part 218 may be made of silicone.

Figure 10:
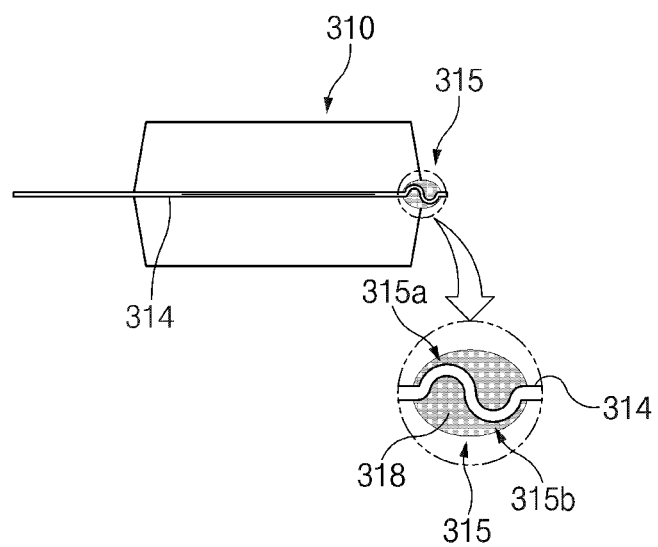
FIG. 10 is a side view illustrating an anti-wrinkle step in a method for manufacturing a secondary battery according to a third embodiment of the present invention.

FIG. 10 is a side view illustrating an anti-wrinkle step in a method for manufacturing a secondary battery according to a third embodiment of the present invention.

Referring to FIGS. 2 and 10, a method for manufacturing a secondary battery 300 according to a third embodiment of the present invention comprises a forming step (S10) of forming a pouch sheet 310, a folding step (S20) of folding the pouch sheet 310, and an anti-wrinkle step (S30) of forming an anti-wrinkle bending part 315 on an outer shell of the pouch sheet 310. Further, the method for manufacturing the secondary battery according to the third embodiment of the present invention may further comprise a sealing step of sealing an outer circumferential surface of the pouch sheet 310 after the folding step (S20).

The method for manufacturing the secondary battery according to the third embodiment of the present invention is the same as the method for manufacturing the secondary battery according to the first and second embodiments of the present invention except for an anti-wrinkle bending part 315 formed through an anti-wrinkle step (S30).

Thus, contents of this embodiment, which are duplicated with those according to the forgoing embodiments, will be briefly described, and also, differences therebetween will be mainly described.

In detail, in the method for manufacturing the secondary battery according to the third embodiment of the present invention, in the anti-wrinkle step (S30), a first sealing part 314 and a second sealing part of a pouch sheet 310 may be thermally compressed to form an anti-wrinkle bending part 315.

In the anti-wrinkle step (S30), the anti-wrinkle bending part 315 may be bent to have a plurality of bent portions.

Furthermore, in the anti-wrinkle step (S30), the anti-wrinkle bending part 315 may be bent in a semicircular shape. In the anti-wrinkle step (S30), the anti-wrinkle bending part 315 may be formed to allow convex portions of a plurality of semicircles to be alternately arranged in upward and downward directions. For example, the anti-wrinkle bending part 315 may have a cross-section having a semicircular pulse shape.

Further, in the anti-wrinkle step (S30), the anti-wrinkle bending part 315 may be bent to have a first bent part 315a and a second bent part 315b. In the anti-wrinkle step (S30), for example, the anti-wrinkle bending part 315 may be formed to have an "S"-shaped cross-section.

In the anti-wrinkle step (S30), the anti-wrinkle bending part 315 may be formed to vertically form the bent portion with respect to the first sealing part 314 and the second sealing part, which are horizontally formed on one side of the battery case 310. Particularly, in the anti-wrinkle step (S30), the anti-wrinkle bending part 315 may be formed at a folding part-side of each of the first sealing part 314 and the second sealing part, which are adjacent to the folding part.

In the anti-wrinkle step (S30), a shape retaining part 118 may be further formed on an outer surface of the anti-wrinkle bending part 315 to retain a shape of the anti-wrinkle bending part 315. The shape retaining part 318 may prevent the anti-wrinkle bending part 315 from being deformed and also prevent the anti-wrinkle effect of the pouch sheet 310 from being deteriorated due to the deformation of the anti-wrinkle bending part 315. In the anti-wrinkle step (S30), the shape retaining part 318 may be applied to the outer surface of the anti-wrinkle bending part 315.

The shape retaining part 318 may be made of an insulating material and a heat-resistance material. For example, the shape retaining part 318 may be made of silicone.

Figure 11:
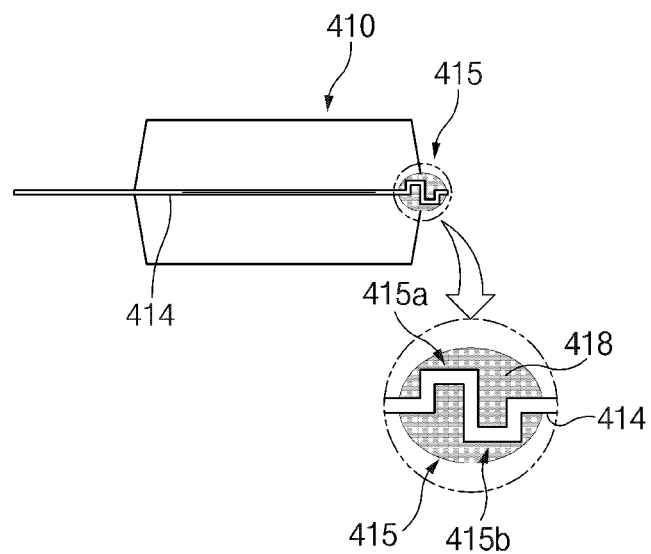
FIG. 11 is a side view illustrating an anti-wrinkle step in a method for manufacturing a secondary battery according to a fourth embodiment of the present invention.

FIG. 11 is a side view illustrating an anti-wrinkle step in a method for manufacturing a secondary battery according to a fourth embodiment of the present invention.

Referring to FIGS. 2 and 11, a method for manufacturing a secondary battery 400 according to a fourth embodiment of the present invention comprises a forming step (S10) of forming a pouch sheet 410, a folding step (S20) of folding the pouch sheet 410, and an anti-wrinkle step (S30) of forming an anti-wrinkle bending part 415 on an outer shell of the pouch sheet 410. Further, the method for manufacturing the secondary battery according to the fourth embodiment of the present invention may further comprise a sealing step of sealing an outer circumferential surface of the pouch sheet 410 after the folding step (S20).

The method for manufacturing the secondary battery according to the fourth embodiment of the present invention is the same as the method for manufacturing the secondary battery according to the first to third embodiments of the present invention except for an anti-wrinkle bending part 415 formed through an anti-wrinkle step (S30).

Thus, contents of this embodiment, which are duplicated with those according to the forgoing embodiments, will be briefly described, and also, differences therebetween will be mainly described.

In detail, in the method for manufacturing the secondary battery according to the fourth embodiment of the present invention, in the anti-wrinkle step (S30), a first sealing part 414 and a second sealing part of a pouch sheet 410 may be thermally compressed to form an anti-wrinkle bending part 415.

In the anti-wrinkle step (S30), the anti-wrinkle bending part 415 may be bent to have a plurality of bent portions. For example, in the anti-wrinkle step (S30), the anti-wrinkle bending part 415 may be bent in a bent shape. Furthermore, in the anti-wrinkle step (S30), the anti-wrinkle bending part 415 may be bent in a rectangular shape. In the anti-wrinkle step (S30), the anti-wrinkle bending part 415 may be formed to allow convex portions of a plurality of rectangular shapes to be alternately arranged in upward and downward directions. For example, the anti-wrinkle bending part 415 may have a cross-section having a rectangular pulse shape.

Further, in the anti-wrinkle step (S30), the anti-wrinkle bending part 415 may be bent to have a first bent part 415a and a second bent part 415b. For example, the first bent part 415a may be formed as a convex portion, and the second bent part 415b may be formed as a concave portion.

In the anti-wrinkle step (S30), the anti-wrinkle bending part 415 may be formed to vertically form the bent portion with respect to the first sealing part 414 and the second sealing part, which are horizontally formed on one side and the other side surface of the battery case 410. Particularly, in the anti-wrinkle step (S30), the anti-wrinkle bending part 415 may be formed at a folding part-side of each of the first sealing part 414 and the second sealing part, which are adjacent to the folding part.

In the anti-wrinkle step (S30), a shape retaining part 418 may be further formed on an outer surface of the anti-wrinkle bending part 415 to retain a shape of the anti-wrinkle bending part 415. The shape retaining part 418 may prevent the anti-wrinkle bending part 415 from being deformed and also prevent the anti-wrinkle effect of the pouch sheet 410 from being deteriorated due to the deformation of the anti-wrinkle bending part 415. In the anti-wrinkle step (S30), the shape retaining part 418 may be applied to the outer surface of the anti-wrinkle bending part 415.

The shape retaining part 418 may be made of an insulating material and a heat-resistance material. For example, the shape retaining part 418 may be made of silicone.

Referring to FIGS. 3 and 7, the secondary battery 100 according to the first embodiment of the present invention comprises an electrode assembly 120 and a battery case 110 which accommodates the electrode assembly 120 therein and on which the anti-wrinkle bending part 115 is formed on an outer shell thereof.

The secondary battery 100 according to the first embodiment of the present invention relates to the secondary battery 100 manufactured through the method of manufacturing the secondary battery according to the foregoing first embodiment of the present invention, and thus, duplicated contents will be briefly described, and differences will be mainly described.

In the electrode assembly 120, electrodes and separators may be alternately combined and stacked on each other.

The battery case 110 is formed by folding a pouch sheet 110 to accommodate the electrode assembly 120.

Referring to FIGS. 6 to 8, an anti-wrinkle bending part 115 may be formed on an outer shell to prevent wrinkles from being generated on the battery case 110.

Further, the anti-wrinkle bending part 115 may be bent to have a plurality of bent portions through thermal compression, thereby preventing the wrinkles from being generated on the outer shell of the battery case and portions that are in the vicinity of the outer shell. For example, the anti-wrinkle bending part 115 may be bent in a zigzag shape.

In four directions on the outer shell of the battery case 110, a folding part 116 may be formed at a first side 110a, a first sealing part 114 and a second sealing part 117 may be formed at a second side 110b and a third side 110c in both directions of the folding part 116, and the anti-wrinkle bending part 115 may be formed on the first sealing part 114 and the second sealing part 117.

Further, the anti-wrinkle bending part 115 may be, for example, formed on the folding part 116 of each of the first sealing part 114 and the second sealing part 116 on the outer shell of the battery case 110. In other words, the anti-wrinkle bending part 115 may be formed at a portion of each of the first sealing part 114 and the second sealing part 117, which is in the vicinity of the folding part 116. The anti-wrinkle bending part 115 may have, for example, a length that corresponds to 5% to 15% of a length of each of the first sealing part 114 and the second sealing part 117. Particularly, the anti-wrinkle bending part 115 may have, for example, a length that corresponds to 10% of a length of each of the first sealing part 114 and the second sealing part 117.

In addition, the anti-wrinkle bending part 115 may be formed over the entire first and second sealing parts 114 and 117 on the outer shell of the battery case 110.

For another example, the anti-wrinkle bending part 115 may be formed at the folding part 116 on the outer shell of the battery case 110.

For another example, the anti-wrinkle bending part 115 may be formed at the first sealing part 114, the second sealing part 117, and the folding part 116 on the outer shell of the battery case 110.

The anti-wrinkle bending part 115 may be bent to have a first bent part 115a and a second bent part 115b. For example, the anti-wrinkle bending part 115 may have an "N"-shaped cross-section.

The secondary battery 100 according to the first embodiment of the present invention may further comprise a shape retaining part 118 provided on an outer surface of the anti-wrinkle bending part 115 to retain a shape of the anti-wrinkle bending part 115. The shape retaining part 118 may prevent the anti-wrinkle bending part 115 from being deformed and also prevent the anti-wrinkle effect of the pouch sheet 110 from being deteriorated due to the deformation of the anti-wrinkle bending part 115.

The shape retaining part 118 may be formed to be applied to the outer surface of the anti-wrinkle bending part 115.

Further, the shape retaining part 118 may be made of an insulating material and a heat-resistance material. For example, the shape retaining part 118 may be made of silicone.

Referring to FIG. 9, the secondary battery 200 according to the second embodiment of the present invention comprises an electrode assembly 120 and a battery case 210 which accommodates the electrode assembly 120 therein and on which the anti-wrinkle bending part 215 is formed on an outer shell thereof (see FIG. 3).

The secondary battery 200 according to the second embodiment of the present invention is the same as the secondary battery according to the first embodiment of the present invention except for a bent shape of the anti-wrinkle bending part 215.

In the secondary battery 200 according to the second embodiment of the present invention, the anti-wrinkle bending part 215 may be bent in a bent shape.

Particularly, the anti-wrinkle bending part 215 may be bent to have a first bent part 215a, a second bent part 215b, and a third bent part 215c. For example, the anti-wrinkle bending part 215 may have a "W"-shaped cross-section.

The secondary battery 200 according to the second embodiment of the present invention may further comprise a shape retaining part 218 provided on an outer surface of the anti-wrinkle bending part 215 to retain a shape of the anti-wrinkle bending part 215. The shape retaining part 218 may prevent the anti-wrinkle bending part 215 from being deformed and also prevent the anti-wrinkle effect of the pouch sheet 210 from being deteriorated due to the deformation of the anti-wrinkle bending part 215.

The shape retaining part 218 may be formed to be applied to the outer surface of the anti-wrinkle bending part 215.

Further, the shape retaining part 218 may be made of an insulating material and a heat-resistance material. For example, the shape retaining part 218 may be made of silicone.

Referring to FIG. 10, the secondary battery 300 according to the third embodiment of the present invention comprises an electrode assembly 120 and a battery case 310 which accommodates the electrode assembly 120 therein and on which the anti-wrinkle bending part 315 is formed on an outer shell thereof (see FIG. 3).

The secondary battery 300 according to the third embodiment of the present invention is the same as the secondary batteries according to the first and second embodiments of the present invention except for a bent shape of an anti-wrinkle bending part 315.

In detail, in the secondary battery according to the third embodiment of the present invention, the anti-wrinkle bending part 315 may be formed to have a plurality of bent portions.

Furthermore, the anti-wrinkle bending part 315 may be bent in a plurality of semicircular shapes. In particular, the anti-wrinkle bending part 315 may be formed to allow convex portions of a plurality of semicircles to be alternately arranged in upward and downward directions. For example, the anti-wrinkle bending part 315 may have a cross-section having a semicircular pulse shape.

The anti-wrinkle bending part 315 may be bent to have a first bent part 315a and a second bent part 315b. For example, the anti-wrinkle bending part 315 may be formed to have an "S"-shaped cross-section.

The secondary battery 300 according to the third embodiment of the present invention may further comprise a shape retaining part 318 provided on an outer surface of the anti-wrinkle bending part 315 to retain a shape of the anti-wrinkle bending part 315. The shape retaining part 318 may prevent the anti-wrinkle bending part 315 from being deformed and also prevent the anti-wrinkle effect of the pouch sheet 310 from being deteriorated due to the deformation of the anti-wrinkle bending part 315.

The shape retaining part 318 may be formed to be applied to the outer surface of the anti-wrinkle bending part 315.

Further, the shape retaining part 318 may be made of an insulating material and a heat-resistance material. For example, the shape retaining part 318 may be made of silicone.

Referring to FIG. 11, the secondary battery 400 according to the fourth embodiment of the present invention comprises an electrode assembly 120 and a battery case 410 which accommodates the electrode assembly 120 therein and on which the anti-wrinkle bending part 415 is formed on an outer shell thereof (see FIG. 3).

The secondary battery 400 according to the fourth embodiment of the present invention is the same as the secondary batteries according to the first to third embodiments of the present invention except for a bent shape of an anti-wrinkle bending part 415.

In detail, in the secondary battery according to the fourth embodiment of the present invention, the anti-wrinkle bending part 415 may be formed to have a plurality of bent portions.

The anti-wrinkle bending part 415 may be, for example, bent in a bent shape. In particular, the anti-wrinkle bending part 415 may be bent in a plurality of rectangular shapes. The anti-wrinkle bending part 415 may be formed to allow convex portions of a plurality of rectangles to be alternately arranged in upward and downward directions. For example, the anti-wrinkle bending part 415 may have a cross-section having a rectangular pulse shape.

The anti-wrinkle bending part 415 may be formed to comprise a first bent part 415a and a second bent part 415b. For example, the first bent part 415a may be formed as a convex portion, and the second bent part 415b may be formed as a concave portion.

The secondary battery 400 according to the fourth embodiment of the present invention may further comprise a shape retaining part 418 provided on an outer surface of the anti-wrinkle bending part 415 to retain a shape of the anti-wrinkle bending part 415. The shape retaining part 418 may prevent the anti-wrinkle bending part 415 from being deformed and also prevent the anti-wrinkle effect of the pouch sheet 410 from being deteriorated due to the deformation of the anti-wrinkle bending part 415.

The shape retaining part 418 may be applied to the outer surface of the anti-wrinkle bending part 415.

Further, the shape retaining part 418 may be made of an insulating material and a heat-resistance material. For example, the shape retaining part 418 may be made of silicone.

Figure 12:
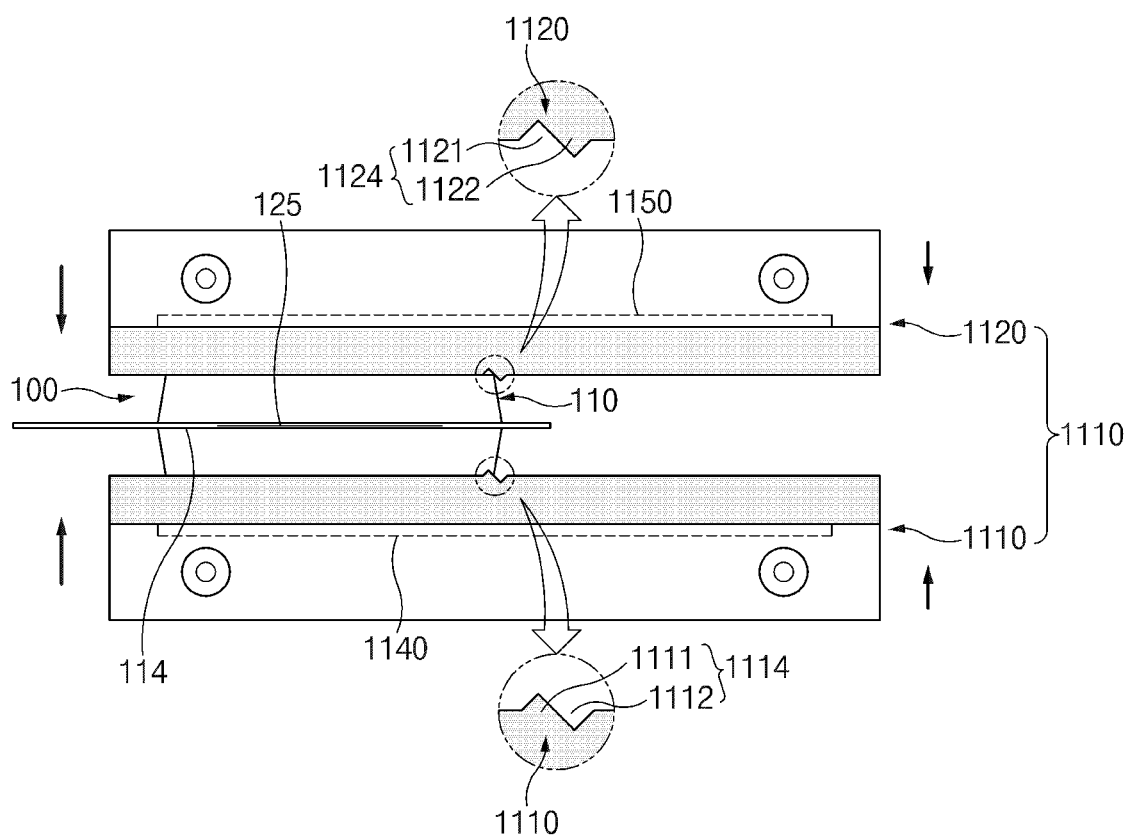
FIG. 12 is a side view illustrating a state before pressing with a pressing block for the secondary battery according to the first embodiment of the present invention.
Figure 13:
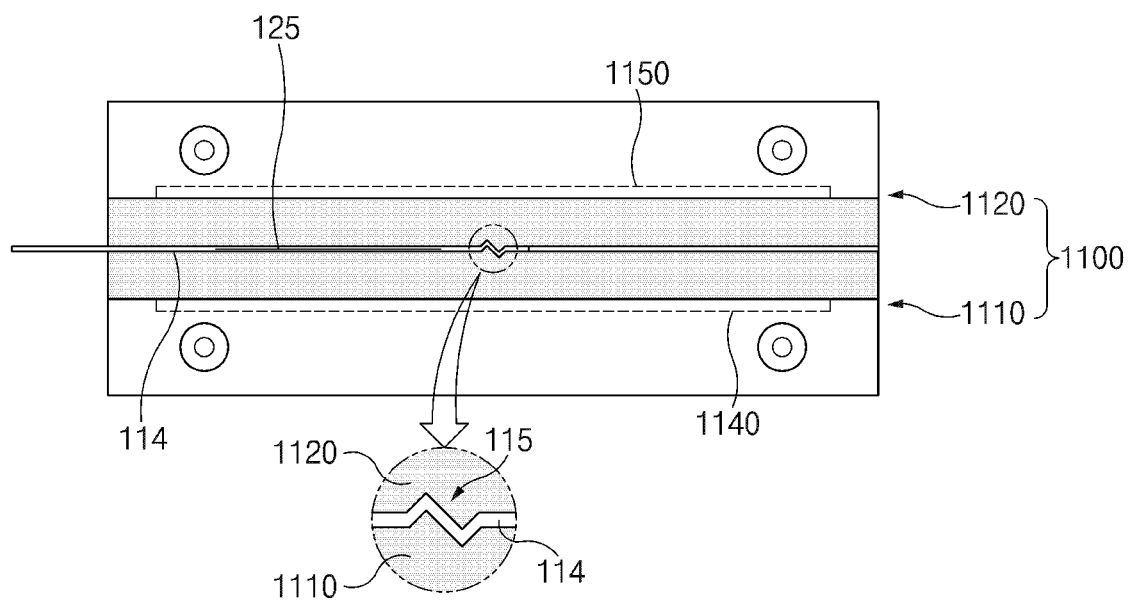
FIG. 13 is a side view illustrating a state during the pressing with the pressing block for the secondary battery according to the first embodiment of the present invention.
Figure 14:
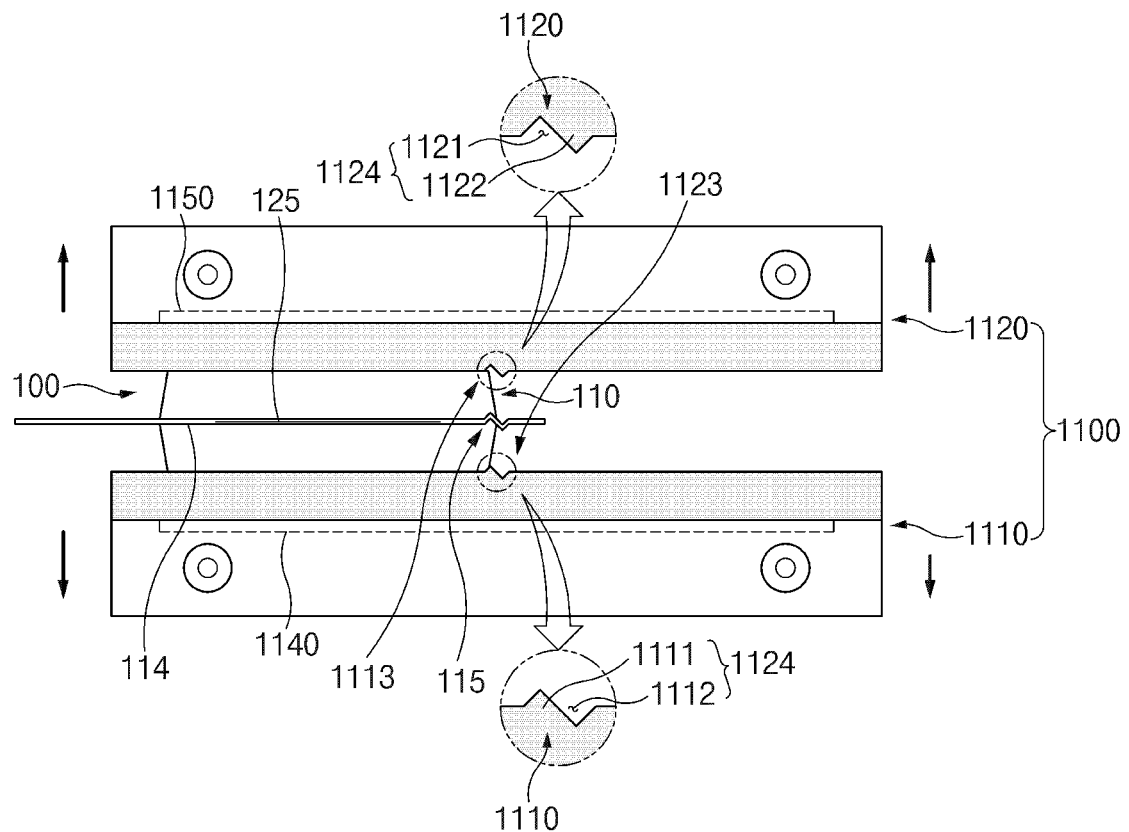
FIG. 14 is a side view illustrating a state after the pressing with the pressing block for the secondary battery according to the first embodiment of the present invention.

FIG. 12 is a side view illustrating a state before pressing with a pressing block for the secondary battery according to the first embodiment of the present invention, FIG. 13 is a side view illustrating a state during the pressing with the pressing block for the secondary battery according to the first embodiment of the present invention, and FIG. 14 is a side view illustrating a state after the pressing with the pressing block for the secondary battery according to the first embodiment of the present invention.

Referring to FIGS. 12 to 14, a pressing block 1100 for the secondary battery according to the first embodiment of the present invention may be provided in plurality, and the plurality of pressing blocks 1100 may move in a direction that faces each other to press an outer shell of the pouch sheet 110 in which the electrode assembly 120 is accommodated. In particular, the pressing block 1100 may comprise a first pressing block 1110 and a second pressing block 1120, which move in the direction that faces each other to press the outer shell (see FIG. 3).

When the pressing block 1100 presses the outer shell of the pouch sheet 110, bending formation parts 1114 and 1124 are formed on a pressing surface of the pressing block 1100 to form an anti-wrinkle bending part 115 on the outer shell.

The bending formation parts 1114 and 1124 may comprise convex parts 1111 and 1122 and concave parts 1112 and 1121 to form the anti-wrinkle bending part 115 on the outer shell when pressing. The convex parts 1111 and 1122 may protrude from the pressing surface, and the concave parts 1112 and 1121 may be formed as grooves that are recessed from the pressing surface. To form the anti-wrinkle bending part 115 on the outer shell using the convex parts 1111 and 1122 and the concave parts 1112 and 1121, each of the convex parts 1111 and 1122 may protrude in a triangular shape, and each of the concave parts 1112 and 1121 may be recessed in a triangular shape.

Further, the bending formation parts 1114 and 1124 formed in the first pressing block 1110 and the second pressing block 1120 may be formed in shapes that correspond to each other in the direction facing each other.

Each of the bending formation parts 1114 and 1124 may have, for example, an "N"-shaped cross-section.

The pressing block 1100 for the secondary battery according to the first embodiment of the present invention may further comprise heaters 1140 and 1150 for transferring heat to the plurality of pressing blocks 1100. Thus, the heat may be applied to the outer shell of the pouch sheet 110 to perform thermal compression through the plurality of pressing blocks 1100.

Figure 15:
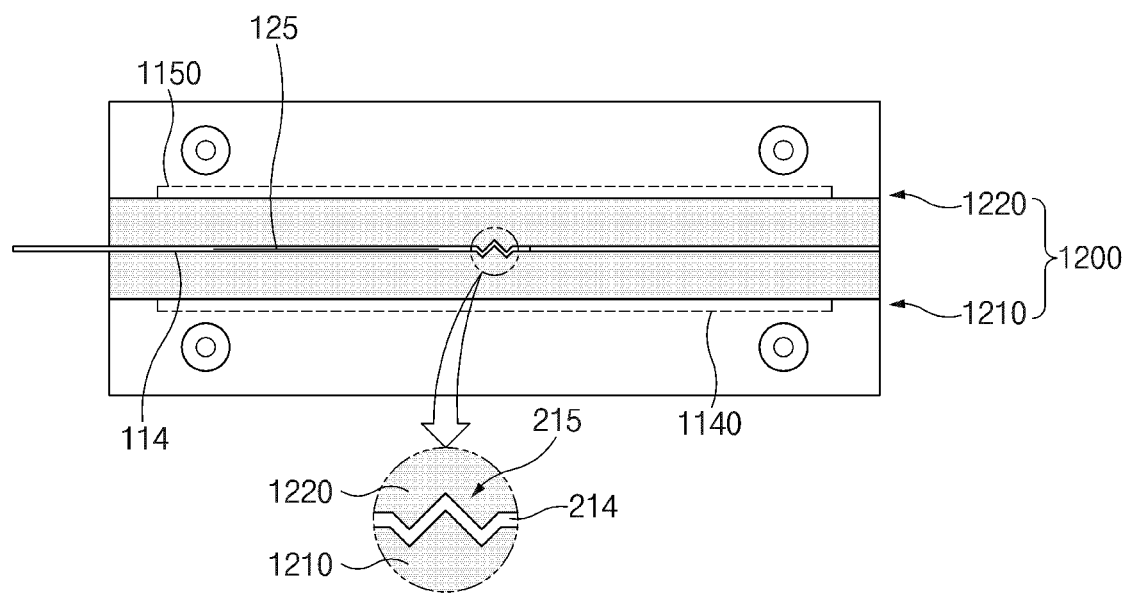
FIG. 15 is a side view illustrating a state during pressing with a pressing block for the secondary battery according to the second embodiment of the present invention.
Figure 16:
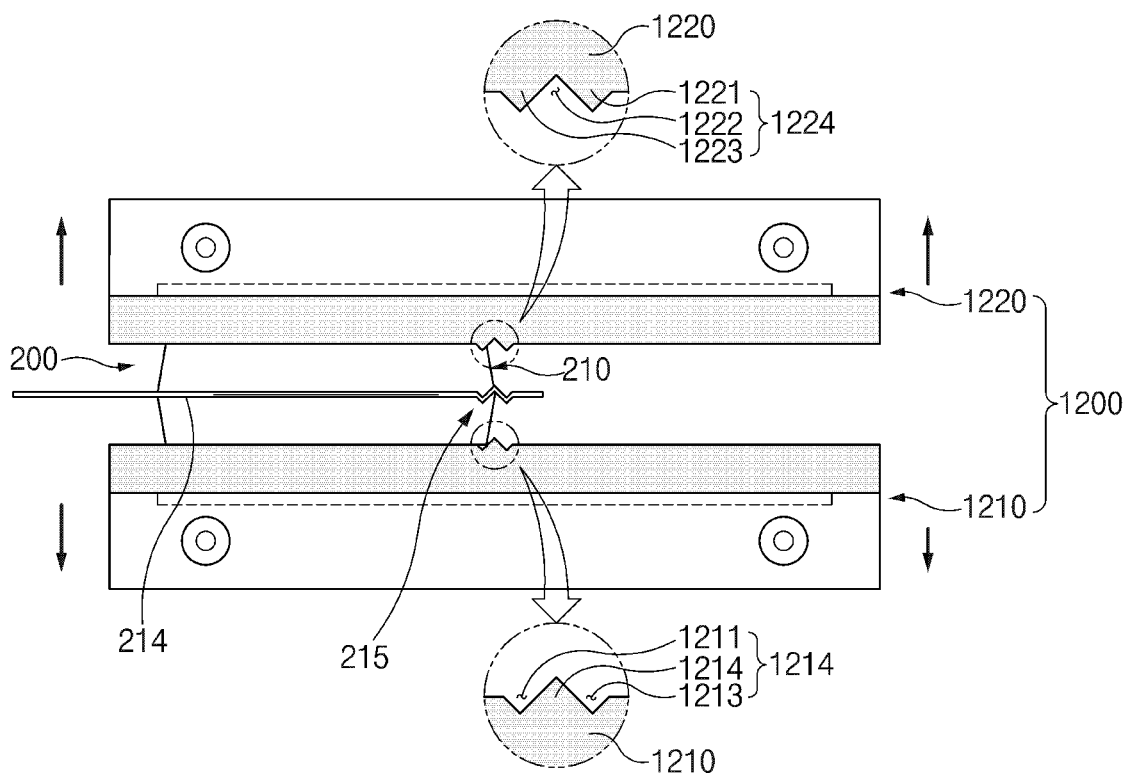
FIG. 16 is a side view illustrating a state after the pressing with the pressing block for the secondary battery according to the second embodiment of the present invention.

FIG. 15 is a side view illustrating a state during pressing with a pressing block for the secondary battery according to the second embodiment of the present invention, and FIG. 16 is a side view illustrating a state after the pressing with the pressing block for the secondary battery according to the second embodiment of the present invention.

Referring to FIGS. 15 to 16, a pressing block 1200 for the secondary battery according to the second embodiment of the present invention may be provided in plurality, and the plurality of pressing blocks 1200 may move in a direction that faces each other to press a first sealing part 214 and a second sealing part of the pouch sheet 210 in which the electrode assembly is accommodated. The pressing block

1200 may comprise a first pressing block 1210 and a second pressing block 1220, which move in a direction that faces each other to press a first sealing part 214 and a second sealing part.

The pressing block 1200 for the secondary battery according to the second embodiment of the present invention is the same as the pressing block for the secondary battery according to the first embodiment of the present invention except for a shape of each of bending formation parts 1214 and 1224.

In the pressing block 1200 for the secondary battery according to the second embodiment of the present invention, the bending formation parts 1214 and 1224 may comprise convex parts 1214, 1221, and 1223 and concave parts 1211, 1213, and 1222 to form an anti-wrinkle bending part 215 on a first sealing part 214 and a second sealing part when pressing. The convex parts 1214, 1221, and 1223 may protrude from the pressing surface, and the concave parts 1211, 1213, and 1222 may be formed as grooves that are recessed from the pressing surface. To form the anti-wrinkle bending part 215 on the first sealing part 214 and the second sealing part by using the convex parts 1214, 1221, and 1223 and the concave parts 1211, 1213, and 1222, each of the convex parts 1214, 1221, and 1223 may protrude in a triangular shape, and each of the concave parts 1211, 1213, and 1222 may be recessed in a triangular shape.

Further, the bending formation parts 1214 and 1224 formed in the first pressing block 1210 and the second pressing block 1220 may be formed in shapes that correspond to each other in the direction facing each other.

Each of the bending formation parts 1214 and 1224 may have, for example, a "W"-shaped cross-section.

Figure 17:
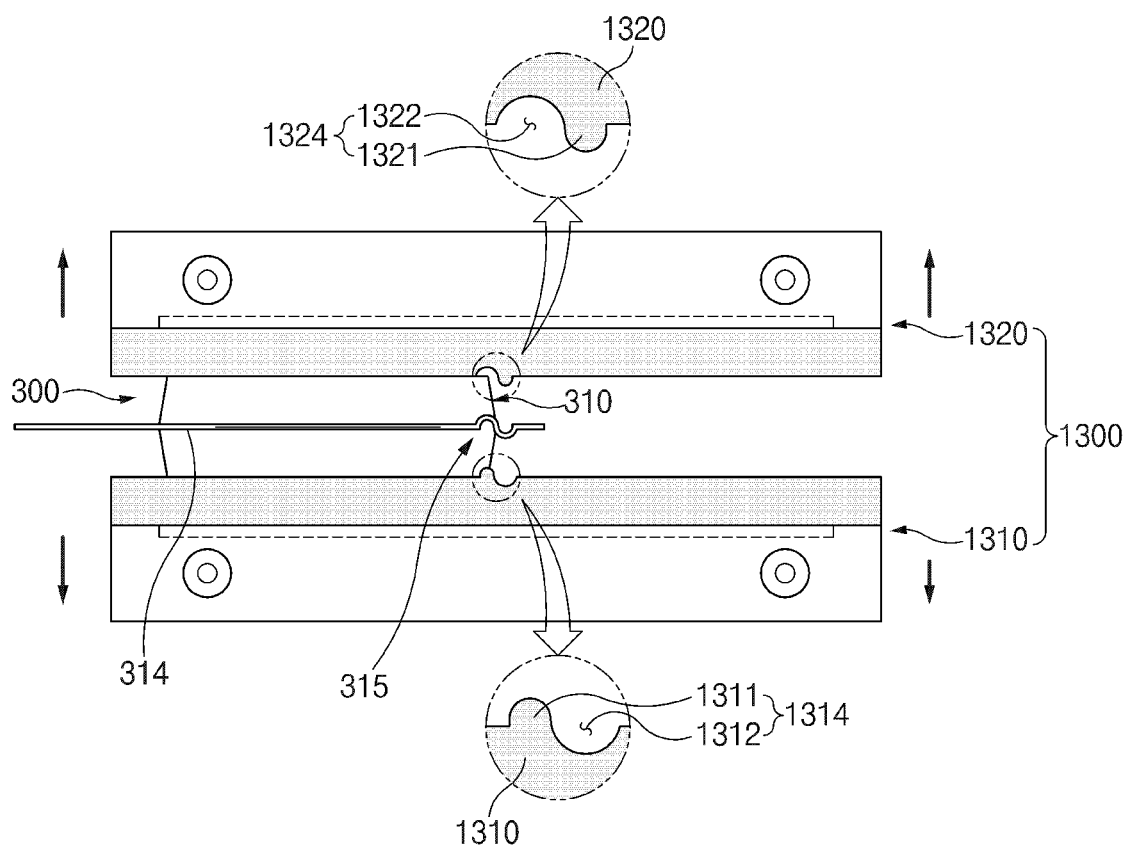
FIG. 17 is a side view illustrating a state after pressing with a pressing block for the secondary battery according to the third embodiment of the present invention.

FIG. 17 is a side view illustrating a state after pressing with a pressing block for the secondary battery according to the third embodiment of the present invention.

Referring to FIG. 17, a pressing block 1300 for the secondary battery according to the third embodiment of the present invention may be provided in plurality, and the plurality of pressing blocks 1300 may move in a direction facing each other to press a first sealing part 314 and a second sealing part of the pouch sheet 310 in which the electrode assembly is accommodated. The pressing block 1300 may comprise a first pressing block 1310 and a second pressing block 1320, which move in a direction that faces each other to press a first sealing part 314 and a second sealing part.

The pressing block 1200 for the secondary battery according to the third embodiment of the present invention is the same as the pressing block for the secondary battery according to the first and the second embodiments of the present invention except for a shape of each of bending formation parts 1314 and 1324.

In more detail, in the pressing block 1300 for the secondary battery according to the third embodiment of the present invention, the bending formation parts 1314 and 1324 may comprise convex parts 1311 and 1321 and concave parts 1312 and 1322 to form an anti-wrinkle bending part 315 on a first sealing part 314 and a second sealing part when pressing.

The convex parts 1311 and 1321 may protrude from the pressing surface, and the concave parts 1312 and 1322 may be formed as grooves that are recessed from the pressing surface. To form the anti-wrinkle bending part 315 on the first sealing part 314 and the second sealing part by using the convex parts 1311 and 1321 and the concave parts 1312 and 1322, each of the convex parts 1311 and 1321 may protrude in a semicircular shape, and each of the concave parts 1312 and 1322 may be recessed in a semicircular shape. For example, each of the bending formation parts 1314 and 1324 may have a cross-section having a semicircular pulse shape. Each of the bending formation parts 1314 and 1324 may have, for example, an "S"-shaped cross-section.

The bending formation parts 1314 and 1324 formed in the first pressing block 1310 and the second pressing block 1320 may be formed in shapes that correspond to each other in the direction facing each other.

Figure 18:
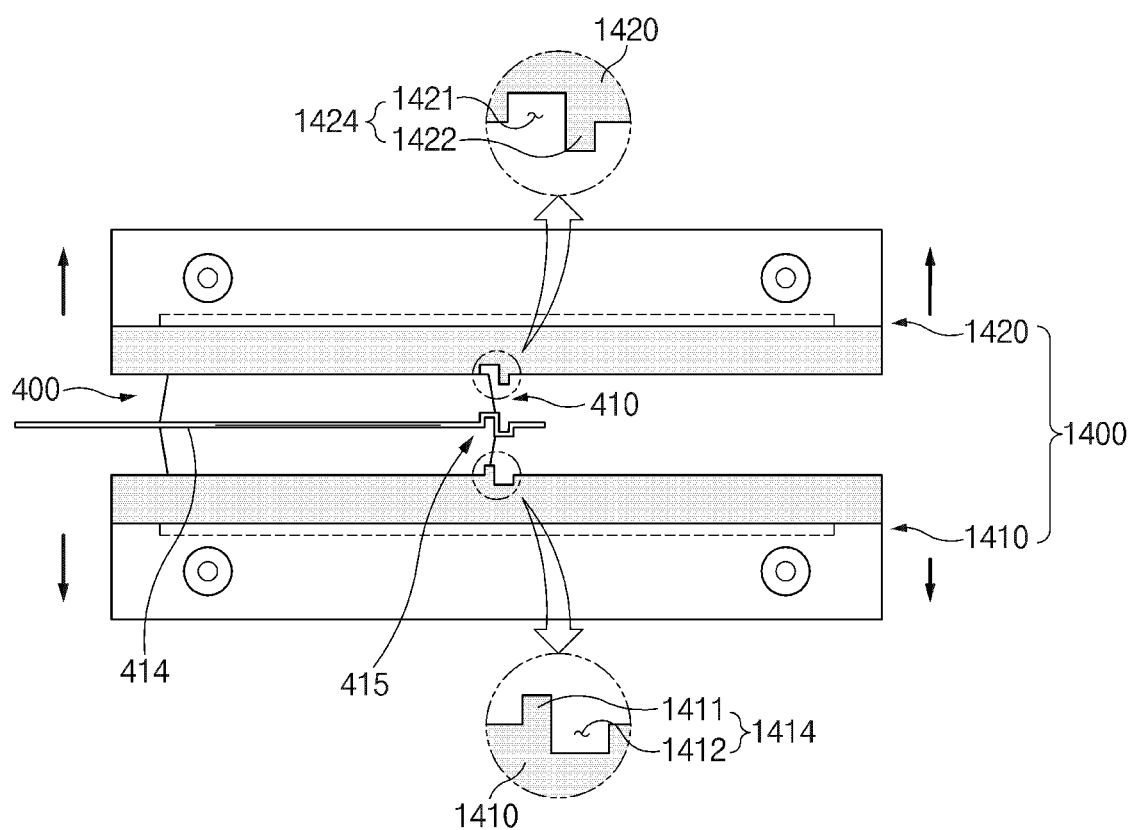
FIG. 18 is a side view illustrating a state after pressing with a pressing block for the secondary battery according to the fourth embodiment of the present invention.

FIG. 18 is a side view illustrating a state after pressing with a pressing block for the secondary battery according to the fourth embodiment of the present invention.

Referring to FIG. 18, a pressing block 1400 for the secondary battery according to the fourth embodiment of the present invention may be provided in plurality, and the plurality of pressing blocks 1400 may move in a direction that faces each other to press and compress a first sealing part 414 and a second sealing part of the pouch sheet 410 in which the electrode assembly is accommodated. The pressing block 1400 may comprise a first pressing block 1410 and a second pressing block 1420, which move in a direction that faces each other to press a first sealing part 414 and a second sealing part.

The pressing block 1400 for the secondary battery according to the fourth embodiment of the present invention is the same as the pressing block for the secondary battery according to the first to third embodiments of the present invention except for a shape of each of bending formation parts 1414 and 1424.

In more detail, in the pressing block 1400 for the secondary battery according to the fourth embodiment of the present invention, the bending formation parts 1414 and 1424 may comprise convex parts 1411 and 1422 and concave parts 1412 and 1421 to form an anti-wrinkle bending part 415 on a first sealing part 414 and a second sealing part when pressing.

The convex parts 1411 and 1422 may protrude from the pressing surface, and the concave parts 1412 and 1421 may be formed as grooves that are recessed from the pressing surface. To form the anti-wrinkle bending part 415 on the first sealing part 414 and the second sealing part by using the convex parts 1411 and 1422 and the concave parts 1412 and 1421, each of the convex parts 1411 and 1422 may protrude in a rectangular shape, and each of the concave parts 1412 and 1421 may be recessed in a rectangular shape. Each of the bending formation parts 1414 and 1424 may have, for example, a cross-section having a rectangular pulse shape.

Further, the bending formation parts 1414 and 1424 formed in the first pressing block 1410 and the second pressing block 1420 may be formed in shapes that correspond to each other in the direction facing each other.

Manufacturing Example 1-1 Manufacture of Electrode Assembly

Electrodes and separators were alternately combined with each other to manufacture an electrode assembly.

1-2 Manufacture of Secondary Battery

A pouch sheet was formed to form an accommodation part to allow the electrode assembly to be accommodated, and was subsequently folded after the manufactured electrode assembly is accommodated in the accommodation part to form a battery case.

An anti-wrinkle bending part having a "W" shape was formed on an outer shell to prevent wrinkles from being generated on the outer shell of the battery case. The anti-wrinkle bending part was formed on a first sealing part and a second sealing part on the outer shell of the battery case to form the anti-wrinkle bending part on a position of each of the first sealing part and the second sealing part, which is disposed at an opposite side of a portion through which a gas is discharged.

Thereafter, an electrolyte was accommodated in the battery case that is formed by forming and folding the pouch sheet, and subsequently, the battery case was sealed to manufacture the secondary battery.

Comparative Example

A secondary battery was manufactured through the same method as the manufacturing example except that the anti-wrinkle bending part having the "W" shape was not formed on the outer wall of the battery case.

Experimental Example

Figure 19:
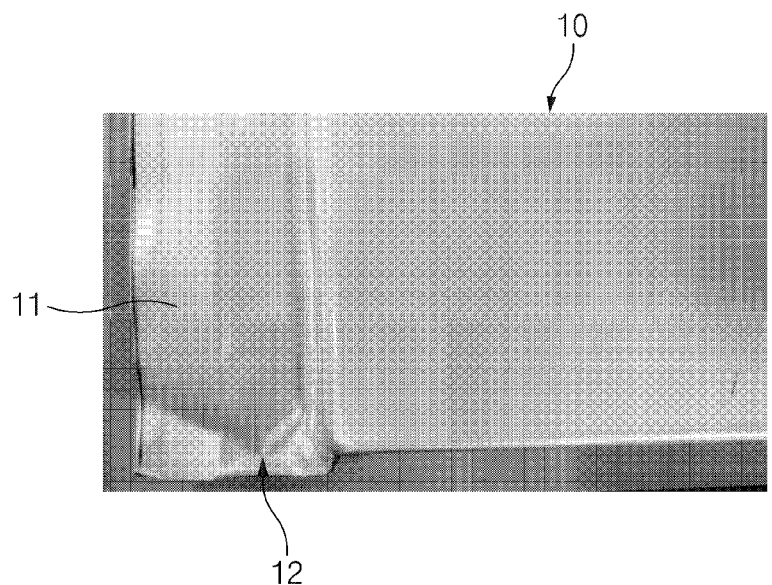
FIG. 19 is a planar image of a secondary battery manufactured according to a comparative example.
Figure 20:
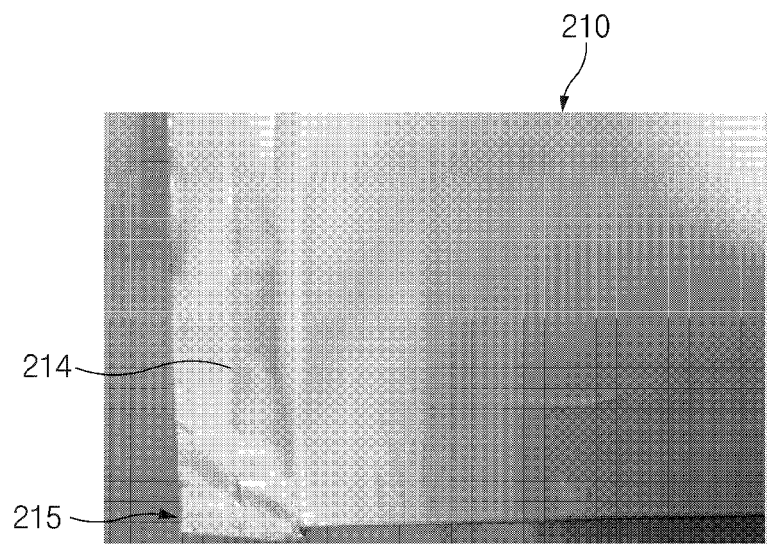
FIG. 20 is a planar image of a secondary battery manufactured according to a manufacturing example.

FIG. 19 is a planar image of a secondary battery manufactured according to a comparative example, and FIG. 20 is a planar image of a secondary battery manufactured according to a manufacturing example.

In the battery case of the secondary battery, it was seen that bat-ear type wrinkles are generated on the outer shell and in the vicinity of the outer shell.

Referring to FIG. 19, according to the results, in the comparative example, the bat-ear type wrinkles 12 were generated on the outer shell 11 of the battery case 10. On the other hand, referring to FIG. 20, in the manufacturing example, it was observed that no bat-ear type wrinkles were generated on the sides of the first sealing part 214 and the second sealing part, on which the anti-wrinkle bending part 215 is formed. Particularly, through the results of repetitive experiments, it was observed that the bat-ear type wrinkles of about 1.5 mm or more in comparison with the comparative example were reduced in the manufacturing examples.

As a result, it may be seen that the generation of the wrinkles in the battery case in the manufacturing example is remarkably reduced.

While the present invention has been particularly shown and described with reference to exemplary embodiments thereof, this is for the purpose of specifically describing the present invention, and thus, the secondary battery, the method for manufacturing the same, and the pressing block for manufacturing the secondary battery according to the present invention are not limited thereto. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A method for manufacturing a secondary battery, the method comprising:
    a forming step of forming a pouch sheet to form an accommodation part, in which an electrode assembly is accommodated, first sealing parts, and a gas pocket part;
    a folding step of folding the pouch sheet with respect to a folding part so that the electrode assembly is accommodated in the accommodation part and the first sealing parts contact each other to block the electrode assembly from an outside environment to form a battery case; and
    an anti-wrinkle step, after performing the folding step, of bending the first sealing parts at a corner adjacent the folding part and opposite the gas pocket part relative to the accommodation part to form an anti-wrinkle part that prevents wrinkles from being generated on an outer shell of the battery case.

2. The method of claim 1, wherein the accommodation part comprises a first accommodation part and a second accommodation part, in the forming step, the first accommodation part and the second accommodation part are formed symmetrical to each other at both sides of the pouch sheet with respect to the folding part, and in the folding step, the first accommodation part and the second accommodation part are folded along a virtual line along the folding part to face each other.

3. The method of claim 1, wherein, in the anti-wrinkle step, the outer shell is thermally compressed so that the anti-wrinkle bending part is formed.

4. The method of claim 3, wherein, in the anti-wrinkle step, the anti-wrinkle bending part is bent to have a plurality of bent portions.

5. The method of claim 4, wherein, in the anti-wrinkle step, the anti-wrinkle bending part has a cross-section of a rectangular pulse shape, in which rectangular concave portions and rectangular convex portions are alternately formed.

6. The method of claim 4, wherein, in the anti-wrinkle step, the anti-wrinkle bending part is bent in a zigzag shape.

7. The method of claim 4, wherein, in the anti-wrinkle step, the anti-wrinkle bending part is formed so that a bent portion is vertically formed with respect to the outer shell formed horizontally on one side surface of the battery case.

8. The method of claim 4, wherein the gas pocket part has a passage extending from the accommodation part, the folding part is formed at a first side, the gas pocket part is formed at a fourth side that is opposite to the folding part, the first sealing parts are formed at a second side, and second sealing parts are formed at a third side in four directions on the outer shell of the battery case, and in the anti-wrinkle step, the anti-wrinkle bending part is formed on the first sealing parts and the second sealing parts adjacent the folding part and opposite the gas pocket part relative to the accommodation part.

9. The method of claim 8, wherein, in the anti-wrinkle step, the anti-wrinkle bending part is formed at a folding part-side on the first sealing parts and the second sealing parts.

10. The method of claim 1, wherein, in the anti-wrinkle step, a silicone is provided on an outer surface of the anti-wrinkle bending part to retain a shape of the anti-wrinkle bending part.

11. A secondary battery, comprising:
    an electrode assembly in which electrodes and separators are alternately combined and stacked on each other; and
    a battery case defining a folding part, an accommodation portion for accommodating the electrode assembly, first sealing parts, and a gas pocket part,
    wherein the first sealing parts are bent at a corner adjacent the folding part and opposite the gas pocket part relative to the accommodation portion so as to form an anti-wrinkle bending part on an outer shell of the battery case to prevent wrinkles from being generated on the outer shell of the battery case.

12. The secondary battery of claim 11, wherein the anti-wrinkle bending part is bent to have a plurality of bent portions.

13. The secondary battery of claim 12, wherein the anti-wrinkle bending part has a cross-section having one of an "S" shape, a "W" shape, or an "N" shape.

14. The secondary battery of claim 12, wherein, in the anti-wrinkle bending part, the bending part is bent in a zigzag shape.

15. The secondary battery of claim 12, wherein the folding part is formed at a first side, the first sealing parts are formed on one sides of the folding part and second sealing parts are formed on another side of the folding part opposite to the first folding parts on the outer shell of the battery case, and the anti-wrinkle bending part is formed on the first sealing parts and the second sealing parts.

16. The secondary battery of claim 11, further comprising a shape retaining part for retaining a shape of the anti-wrinkle bending part on an outer surface of the anti-wrinkle bending part.

17. A pressing block for a secondary battery, the pressing block comprising:

a plurality of pressing blocks moving in a direction facing each other to press and compress an outer shell of a pouch sheet in which an electrode assembly is accommodated; and a bending formation part formed on each of pressing surfaces of the plurality of pressing blocks to form an anti-wrinkle bending part on first sealing parts of the outer shell at a corner adjacent a folding part and opposite a gas pocket part relative to an accommodation part, in which an electrode assembly is accommodated, when the outer shell of the pouch sheet is pressed by the plurality of pressing blocks.

18. The pressing block of claim 17, further comprising a heater for transferring heat to the plurality of pressing blocks so that the heat is applied to the outer shell of the pouch sheet, and the outer shell is thermally compressed through the plurality of pressing blocks.

19. The pressing block of claim 17, wherein the bending formation part comprises a convex portion and a concave portion to compress the anti-wrinkle bending part so that the anti-wrinkle bending part has a plurality of bent portions, and each of the convex portion and the concave portion is formed in one shape of a triangular shape, a rectangular shape, and a semicircular shape.

* * * * *